United States Patent
Green

(10) Patent No.: US 6,351,789 B1
(45) Date of Patent: Feb. 26, 2002

(54) BUILT-IN SELF-TEST CIRCUIT AND METHOD FOR VALIDATING AN ASSOCIATIVE DATA ARRAY

(75) Inventor: Daniel W. Green, McKinney, TX (US)

(73) Assignee: VIA-Cyrix, Inc., Richardson, TX (US)

( * ) Notice: Subject to any disclaimer, the term of this patent is extended or adjusted under 35 U.S.C. 154(b) by 0 days.

(21) Appl. No.: 09/086,866

(22) Filed: May 29, 1998

(51) Int. Cl.[7] ................................................ G06F 12/00
(52) U.S. Cl. ........................ 711/128; 711/114; 714/733; 714/736
(58) Field of Search ............................. 711/114, 128; 714/21, 30, 36, 702, 718, 719, 720, 733, 736

(56) References Cited

U.S. PATENT DOCUMENTS 5,732,209 A * 3/1998 Vigil et al. ............ 395/183.06
5,987,561 A * 11/1999 Witt et al. ..................... 711/3
5,987,632 A * 11/1999 Irrinki et al. ................ 714/711

* cited by examiner

Primary Examiner—Matthew Kim
Assistant Examiner—Pierre H. Vital
(74) Attorney, Agent, or Firm—Carr & Ferrell LLP

(57) ABSTRACT

There is disclosed, for use in a processing device having an N-way set associative data array (such as an L1 cache), a built-in self-test (BIST) circuit for testing the validity of storage locations in the data array. The BIST circuit comprises 1) a memory capable of storing a test program executable by the processing device, wherein the test program is capable of testing the validity of the storage locations in the data array; and 2) a controller capable of copying the test program from the memory into first selected storage locations in a first way in the data array, wherein the processing device executes the copied test program stored in the first selected storage locations subsequent to the copying to thereby test the validity of second selected storage locations in at least one of the N ways.

22 Claims, 10 Drawing Sheets

BUILT-IN SELF-TEST CIRCUIT AND METHOD FOR VALIDATING AN ASSOCIATIVE DATA ARRAY

CROSS-REFERENCE TO RELATED APPLICATIONS

The present invention is related to those disclosed in: U.S. patent application Ser. No. 08/865,644, entitled "CACHE CIRCUIT WITH PROGRAMMABLE SIZING AND METHOD OF OPERATION" and filed on May 30, 1997; now U.S. Pat. No. 5,849,131; U.S. patent application Ser. No. 08/866,565, entitled "TRANSLATION LOOK-ASIDE BUFFER SLICE CIRCUIT AND METHOD OF OPERATION" and filed on May 30, 1997; now U.S. Pat. No. 6,065,091 U.S. patent application Ser. No. 08/866,441, entitled "SHADOW TRANSLATION LOOK-ASIDE BUFFER AND METHOD OF OPERATION" and filed on May 30, 1997; now U.S. Pat. No. 5,946,718 U.S. patent application Ser. No. 08/866,691, entitled "HIT DETERMINATION CIRCUIT FOR SELECTING A DATA SET BASED ON MISS DETERMINATIONS IN OTHER DATA SETS AND METHOD OF OPERATION" and filed on May 30, 1997; now U.S. Pat. No. 5,970,509; U.S. patent application Ser. No. 08/992,355, entitled "FAST RAM FOR USE IN AN ADDRESS TRANSLATION CIRCUIT AND METHOD OF OPERATION" and filed on Dec. 17, 1997; now U.S. Pat. No. 6,032,241; U.S. patent application Ser. No. 08/992,348, entitled "REAL MODE TRANSLATION LOOK-ASIDE BUFFER AND METHOD OF OPERATION" and filed on Dec. 17, 1997; now U.S. Pat. No. 6,154,643; and U.S. patent application Ser. No. 08/865,909 entitled "CACHE WITH FINELY GRANULAR LOCKED-DOWN REGIONS" and filed on May 30, 1997, now U.S. Pat. No. 6,044,478.

Each reference is commonly assigned with the present invention and is incorporated herein by reference for all purposes.

TECHNICAL FIELD OF THE INVENTION

The present invention is directed, in general, to microprocessors and, more specifically, to microprocessors that implement associative data arrays, including cache memory circuits.

BACKGROUND OF THE INVENTION

The start-up (or "boot") operations that occur when a computer is first started (or is restarted) include a number of built-in self-test (BIST) routines that are run on different components of the computer in order to validate the operation of the computer. If all component parts "pass" the BIST routines, the computer begins running applications selected by the user. If one or more components "fail" the BIST routine(s) and the error(s) is (are) catastrophic in nature, the computer may completely shut down, thereby becoming completely inoperable. If a less-than-catastrophic error occurs, the computer may perform a "patch" operation that allows the computer to continue to operate, albeit in a mode that is somewhat degraded. For example, if a self test routine determines that a memory location in RAM is bad, the operating system can "map out" the bad RAM location, including perhaps surrounding memory locations, and continue to operate. Thereafter, the computer will not read or write to the memory location(s) that were mapped out as a result of the self-test failure.

BIST routines are implemented in a wide variety of processing circuitry, including microprocessors and digital signal processors. The BIST routines may be performed by BIST circuitry integrated into the same chip as the processing circuitry, or may be performed by external BIST circuitry that is implemented on the same circuit board as the processing circuitry. Complex devices, such as microprocessors, frequently include several on-board BIST circuits that test and validate different sub-components of the device.

Many processing circuits contain what are known as "N-way set associative" data arrays. For example, in the x86 family of processors, including Cyrix 6x86MX processors, AMD $5_k86$ processors, and Intel Pentium processors, one or more of the L1 cache, L2 cache, L1 translation look-aside buffer (TLB), and/or L2 TLB are typically implemented as N-way set associative data arrays. Therefore, one or more BIST circuits may be implemented in such microprocessors to test and validate the N-way set associative data arrays.

Like any other device that is integrated into a processing device, a BIST circuit occupies space on the integrated circuit wafer, it consumes power, and it may itself cause a failure. Thus, a BIST circuit integrated into, for example, a microprocessor is preferably a relatively simple device having a minimum number of transistors. Unfortunately, many of the microprocessors found in the prior art use separate BIST circuits for testing each cache and TLB. Furthermore, these prior art BIST circuits are frequently relatively large, microcode-driven devices that run a series of data patterns through an individual data array. The net result is that a large amount of BIST circuitry is used in the prior art processing devices.

Therefore, there is a need in the art for improved BIST devices for testing and validating components in a processing device. In particular, there is a need for improved microprocessors containing comparatively simple BIST circuits capable of testing N-way set associative data arrays in the microprocessor. More particularly, there is a need in the art for improved microprocessors containing a multifunction BIST circuit capable of testing more than one of the N-way set associative data arrays in a microprocessor.

SUMMARY OF THE INVENTION

To address the above-discussed deficiencies of the prior art, the present invention provides a circuit and method for testing an N-way set associative data array in a processing device. The circuit and method implement a "bootstrap" strategy for testing the ways of the data array. A control circuit copies a small test program into a first portion of one way of the data array. The test program comprises assembly language code executable by the processing device. Next, the control circuit compares the values of the copied test program with the original test program to determine whether the first portion of the first way properly stored the copied test program. If the first portion of the first way passes this test, the processing device then executes the assembly language test program in order to validate the remaining portion of the first way, and all of each remaining way.

Accordingly, one embodiment of the present invention presents, for use in a processing device having an N-way set associative data array, a built-in self-test (BIST) circuit for testing the validity of storage locations in the data array, the BIST circuit comprising: 1) a memory capable of storing a test program executable by the processing device, wherein the test program is capable of testing the validity of the storage locations in the data array; and 2) a controller capable of copying the test program from the memory into first selected storage locations in a first way in the data array, wherein the processing device executes the copied test program stored in the first selected storage locations subsequent to the copying to thereby test the validity of second selected storage locations in at least one of the N ways.

In another embodiment of the present invention, the second selected storage locations and the first selected storage locations are disposed in the same way.

In another embodiment of the present invention, the second selected storage locations and the first selected storage locations are disposed in different ways.

In still another embodiment of the present invention, the controller retrieves at least a portion of the copied test program from the first selected storage locations and compares the retrieved portion to a corresponding portion of the test program in the memory to determine if the retrieved portion and the corresponding portion are identical.

In yet another embodiment of the present invention, the controller, in response to a determination that the retrieved portion and the corresponding portion are not identical, copies the test program from the memory into third selected storage locations in a second way in the data array.

In a further embodiment of the present invention, the controller retrieves at least a portion of the copied test program from the third selected storage locations and compares the retrieved portion to a corresponding portion of the test program in the memory to determine if the retrieved portion and the corresponding portion are identical.

In a still further embodiment of the present invention, the processing device executes the copied test program stored in the third selected storage locations subsequent to the copying to thereby test the validity of second selected storage locations in at least one of the N ways.

In another embodiment of the present invention, the memory is a read-only memory (ROM).

In another embodiment of the present invention, the data array is a cache memory in the processing device.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
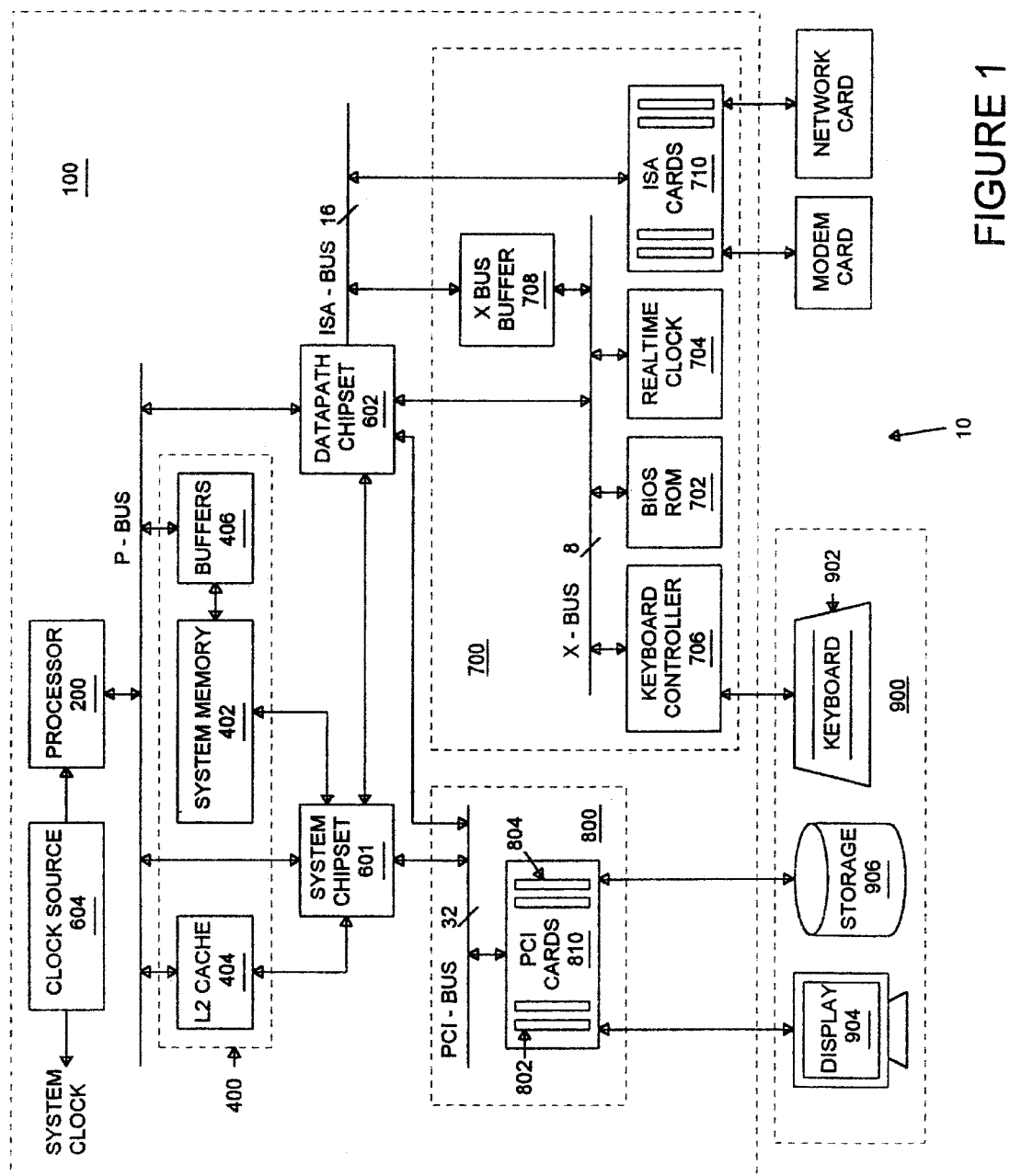
FIG. 1 is a block diagram of an exemplary system employing a processor in accordance with the principles of the present invention.

The detailed description of the preferred embodiment for the present invention is organized as follows:

| | | | |
|---|---|---|---|
| 1. | Exemplary Computing System | | |
| 2. | Exemplary Processor | | |
| | 2.1 | Core | |
| | | 2.1.1 | The Integer Unit |
| | | 2.1.2 | Out-of-Order Processing |
| | | 2.1.3 | Pipeline Selection |
| | | 2.1.4 | Register Renaming |
| | | 2.1.5 | Data Forwarding |
| | | | 2.1.5.1 Operand Forwarding |
| | | | 2.1.5.2 Result Forwarding |
| | | 2.1.6 | Data Bypassing |
| | | 2.1.7 | Branch Control |
| | | 2.1.8 | Speculative Execution |
| | | 2.1.9 | System Register Set |
| | | | 2.1.9.1 Model Specific Registers |
| | | | 2.1.9.2 Debug Registers |
| | | | 2.1.9.3 Test Registers |
| | | 2.1.10 | The Floating Point Unit |
| | 2.2 | Cache Unit | |

This organizational table, and the corresponding headings used in this detailed description, are provided for convenient reference and are not intended to limit the scope of the present invention. It should be understood that while the preferred embodiment is described below with respect to x86 computer architecture, it has general applicability to any architecture. Certain terms related to x86 computer architecture (such as register names, signal nomenclature, etc.), which are known to practitioners in the field of processor design, are not discussed in detail in order not to obscure the disclosure.

Moreover, certain structural details, which will be readily apparent to those skilled in the art, having the benefit of the description herein, have been illustrated in the drawings by readily understandable block representations and state/flow diagrams that show and describe details that are pertinent to the present invention. These illustrations do not necessarily represent the physical arrangement of the exemplary system, but are primarily intended to illustrate the major structural components in convenient functional groups, so that the present invention may be more readily understood. It is to be understood that other embodiments may be utilized and structural changes may be made without departing from the scope of the present invention.

1. Exemplary Computing System

FIG. 1 is a block diagram of an exemplary computer system 10 employing a processor in accordance with the principles of the present invention. The examplary computer system 10 comprises a system circuit board (a.k.a.

motherboard) 100 and various peripherals and peripheral interfaces. Motherboard 100 comprises a processor 200 and memory subsystem 400 inter-coupled by a processor P-Bus (sometimes referred to as a CPU or local Bus). System logic circuitry interfaces the processor 200 to three conventional peripheral buses namely: X-Bus, PCI-Bus, and ISA-Bus. For the exemplary computer system, the P-Bus is compliant with the so-called "P55C socket."

System logic circuitry comprises a system chipset 601 and a datapath chipset 602 (sometimes referred to as a North-Bridge and South-Bridge, respectively), as well as an external clock source 604 that provides an external clock input to the processor 200 and a system clock signal to the remainder of the motherboard 100. The external clock source 604 may take on many forms without departing from the scope of the present invention, including a digital or analog phase-locked loop or delay line loop circuitry. The exact details are not necessary for understanding the present invention.

Processor 200 and the memory subsystem 400 reside on the P-Bus. The only other direct connections to the P-Bus are the system chipset 601 and the datapath chipset 602. According to the exemplary division of system logic functions, the system chipset 601 interfaces to a conventional 32-bit PCI-Bus, while the datapath chipset 602 interfaces to the 16-bit ISA-Bus and the internal 8-bit X-Bus. In alternative embodiments, a special Advanced Graphics Port (AGP) may provide an interface between the P-Bus and a graphics accelerator.

Processor 200 is coupled over the P-Bus to L2 (level 2) cache 404 and through data buffers 406 to system memory 402 (DRAM). The system chipset 601 includes control circuitry for the P-Bus, system memory 402, and the L2 cache 404. The datapath chipset 602 also interfaces to the conventional X-Bus. The X-Bus is an internal 8-bit bus that couples to the BIOS ROM 702 and the real-time clock (RTC) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals via ISA-compliant peripheral card slots 710. The PCI-Bus provides a higher performance peripheral interface via PCI-compliant peripheral card slots 810 for selected peripherals, such as a video/graphics card 802 and a storage controller 804 (which may be included as part of the system chipset 601) for interfacing to mass storage 906.

The motherboard 100 is coupled to external peripherals 900, such as keyboard 902, display 904, and mass storage 906 through the PCI-, ISA-, and X-Buses. Network and modem interconnections are provided as ISA cards, but it is to be understood that they could also be provided as PCI cards.

2. Exemplary Processor

Figure 2:
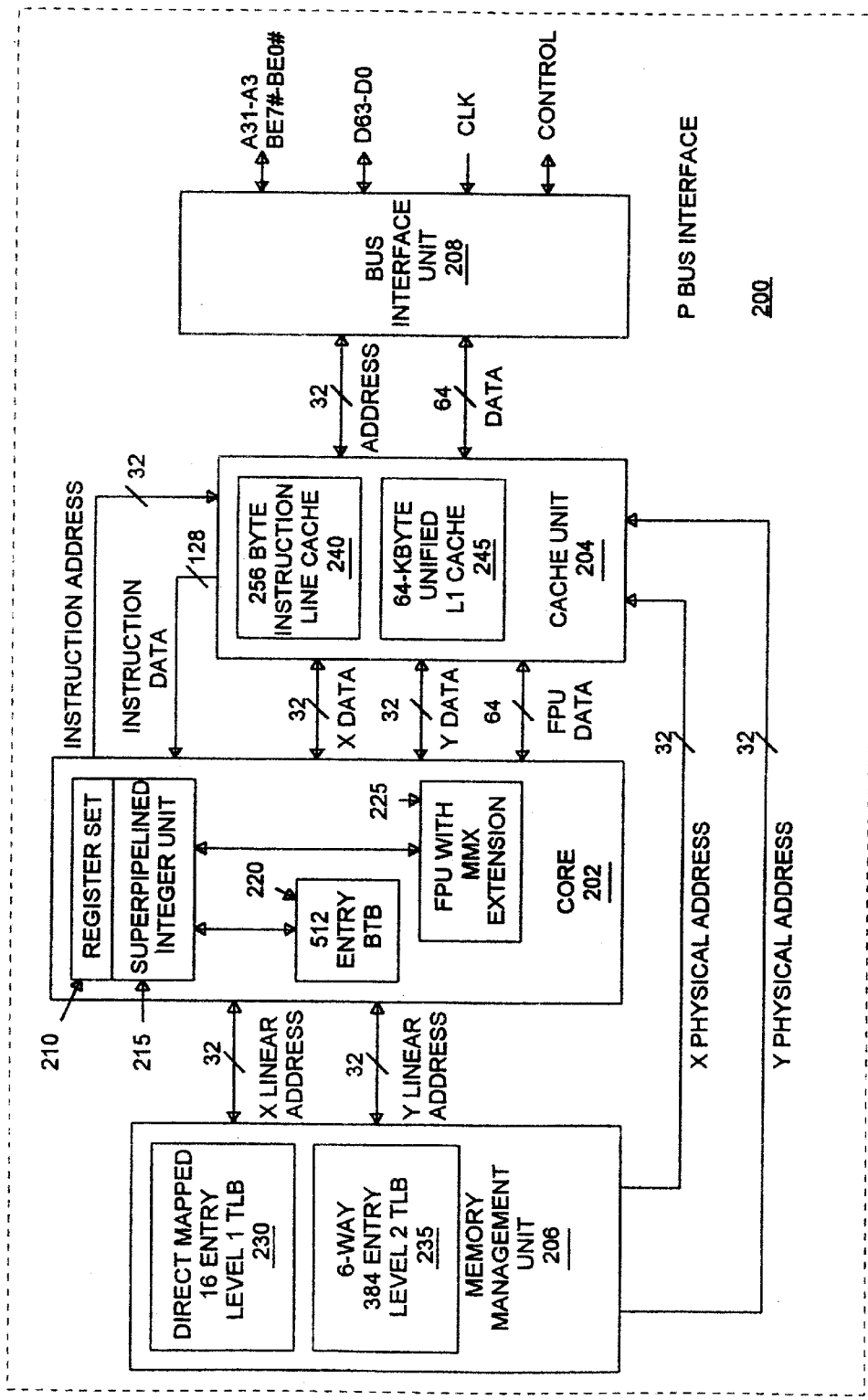
FIG. 2 is a more detailed block diagram of the processor depicted in FIG. 1, which employs cache line locking in accordance with the principles of the present invention.

FIG. 2 is a more detailed block diagram of the processor 200 depicted in FIG. 1, which employs cache line locking in accordance with the principles of the present invention. It is to be understood that other forms of the processor 200 may be utilized and other modifications can be made without departing from the scope and spirit of the present invention. The processor 200 consists of four major functional blocks, namely: 1) core 202, 2) cache unit 204, 3) memory management unit (MMU) 206, and 4) bus interface unit (BIU) 208.

2.1 Core

The core 202 comprises a super-pipelined integer unit (IU) 215, a branch target buffer (BTB) 220, and a floating point unit (FPU) 225. The cache unit 204 comprises a 64 Kbyte unified L1 cache 245 that stores the most recently used data and instruction code and a 256 byte instruction line cache 240 that only stores instruction code. The MMU 206 preferably comprises two translation look-aside buffers (TLBs): a main level one (L1) TLB 230 and a larger level two (L2) TLB 235. The L1 TLB 230 is preferably direct mapped and has 16 entries, each entry holding one line of 42 bits. The L2 TLB 235 is preferably 6-way associative and has 384 entries to hold 384 lines.

The MMU 206 translates linear (or logical) addresses supplied by the IU 215 into physical addresses, including addresses based on paging, for use by the unified L1 cache 245 and for transmission through the BIU 208. Memory management procedures are preferably x86 compatible, adhering to standard paging mechanisms. The Page Table Entry (PTE) is stored in either the unified L1 cache in the Cache Unit 204, the L2 cache 404, or in system memory 402.

The Bus Interface Unit (BIU) provides the P-Bus interface. During a memory cycle, a memory location is selected through the address lines (A31–A3 and BE7#–BE0#) on the P-Bus. Data is passed to/from memory through the data lines (D63–D0) on the P-Bus.

The core 202 requests instructions from the cache unit 204. The received integer instructions are decoded by either the X-processing pipeline or Y-processing pipeline within the super-pipeline IU 215. If the instruction is a multimedia extension or FPU instruction, the instruction is passed to the FPU 225 for processing. As required, data is fetched from the 64 Kbyte unified L1 cache 245. If the data is not in the unified L1 cache 245, the data is accessed via the BIU 208 from either the L2 cache 404 or system memory 402.

2.1.1 The Integer Unit

Figure 3:
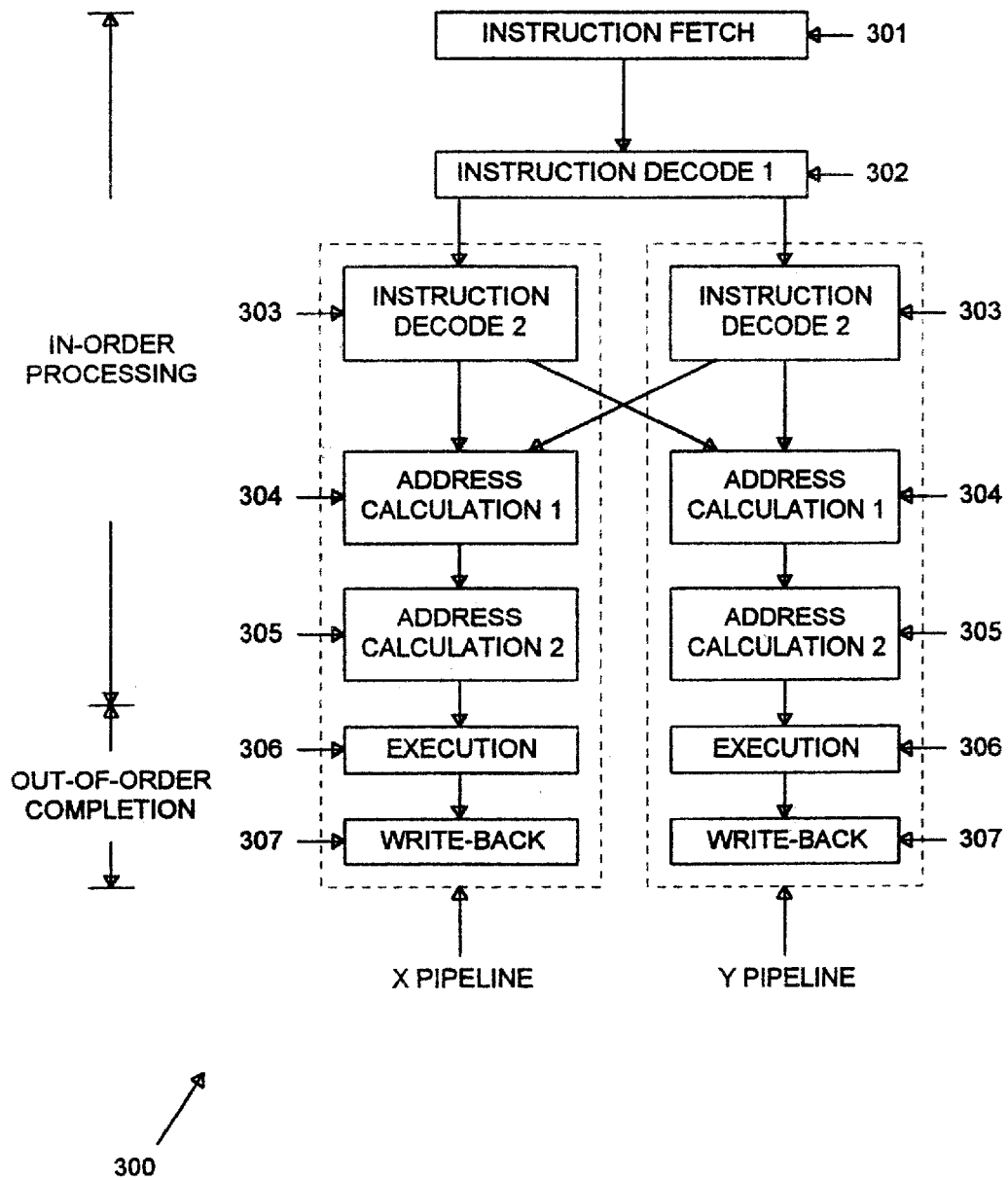
FIG. 3 is a more detailed block diagram of the pipelined stages of the Integer Unit depicted in FIG. 2.

FIG. 3 is a more detailed block diagram of the pipelined stages of the integer unit 215 depicted in FIG. 2. Parallel instruction execution is provided by two seven-stage integer pipelines, referred to as the X-pipeline and the Y-pipeline. Each of the X- and Y-pipelines can process several instructions simultaneously. The IU 215 comprises the following pipeline stages: Instruction Fetch (IF) 301, Instruction Decode 1 (ID1) 302, Instruction Decode 2 (ID2) 303, Address Calculation 1 (AC1) 304, Address Calculation 2 (AC2) 305, Execution 306, and Write-Back 307.

The IF 301 stage, shared by both the X- and Y-pipelines, fetches 16 bytes of code from the cache unit 204 in a single clock cycle. Within the IF 301 stage, the code stream is checked for any branch instructions that could affect normal program sequencing. If an unconditional or conditional branch is detected, branch prediction logic within the IF 301 stage generates a predicted target address for the instruction. The IF 301 stage then begins fetching instructions at the predicted address.

The super-pipelined Instruction Decode stage comprise the ID1 302 substage and ID2 303 substage. ID1, shared by both X- and Y-pipelines, evaluates the code stream provided by the IF 301 stage and determines the number of bytes in each instruction. Up to two instructions per clock are delivered to the ID2 substages, one in each pipeline.

The ID2 303 substage decodes instructions and sends the decoded instructions to either the X- or Y-pipeline for execution. The particular pipeline is chosen, based on which instructions are already in each pipeline and how fast they are expected to flow through the remaining pipe-line stages.

The Address Calculation stage comprises the AC1 304 sub-stage and the AC2 305 substage. If the instruction refers to a memory to operand, the AC1 substage calculates a linear memory address for the instruction. The AC2 substage performs any required memory management functions, cache accesses, and register file accesses. If a floating point instruction is detected by the AC2 substage, the instruction is sent to the FPU 225 for processing. The Execution 306 stage executes instructions using the operands provided by the address calculation stage. The Write-Back 307 stage stores execution results either to a register file within the IU 215 or to a write buffer in the cache control unit.

2.1.2 Out-of-Order Processing

If an instruction executes faster than the previous instruction in the other pipeline, the instructions may complete out of order. All instructions are processed in order, up to the Execution 306 stage. While in the Execution 306 and Write-Back 307 stages, instructions may be completed out of order. If there is a data dependency between two instructions, hardware interlocks are enforced to ensure correct program execution. Even though instructions may complete out of order, exceptions and writes resulting from the instructions are always issued in program order.

2.1.3 Pipeline Selection

In most cases, instructions are processed in either pipeline and without pairing constraints on the instructions. However, certain instructions are preferably processed only in the X-pipeline, such as branch, floating point, and exclusive instructions. Branch and floating point instructions may be paired with a second instruction in the Y-pipeline. Exclusive instructions (e.g., protected mode segment loads, special control, debug, and test register accesses, string instructions, multiply and divide, I/O port accesses, push all and pop all, and inter-segment jumps, calls, and returns), which typically require multiple memory accesses, are preferably not paired with instructions in the Y-pipeline. Although exclusive instructions are not paired, hardware from both pipelines is used to accelerate instruction completion.

When two instructions that are executing in parallel require access to the same data or register, one of the following types of data dependencies may occur: Read-After-Write (RAW), Write-After-Read (WAR), and Write-After-Write (WAW). Data dependencies typically force serial execution of instructions. However, the processor 200 employs register renaming, data forwarding, and data bypassing mechanisms that allow parallel execution of instructions containing data dependencies.

2.1.4 Register Renaming

The processor 200 includes a register file containing 32 physical general purpose registers, each of which can be temporarily assigned as one of the general purpose registers defined by the x86 architecture (EAX, EBX, ECX, EDX, ESI, EDI, EBP, and ESP). For each register write operation, a new physical register is selected to allow previous data to be retained temporarily—effectively removing WAW and WAR dependencies. The programmer does not have to consider register renaming, since register renaming is completely transparent to both the operating system and application software.

A WAR dependency exists when the first in a pair of instructions reads a logical register, and the second instruction writes to the same logical register. This type of dependency is illustrated by the pair of instructions shown below. In this and the following examples the original instruction order is shown in parentheses.

| X-PIPELINE | Y-PIPELINE |
|---|---|
| (1) MOV BX, AX | (2) ADD AX, CX |
| BX ← AX | AX ← AX + CX |

In the absence of register renaming, the ADD instruction in the Y-pipeline would have to be stalled to allow the MOV instruction in the X-pipeline to read the AX register. The processor 200, however, can avoid the Y-pipeline stall, as shown below in Table 1. As each instruction executes, the results are placed in new physical registers to avoid the possibility of overwriting a logical register value and to allow the two instructions to complete in parallel (or out of order) rather than in sequence.

TABLE 1

Register Renaming with WAR Dependency

| | Physical Register Contents | | | | | | |
|---|---|---|---|---|---|---|---|
| Instruction | Reg0 | Reg1 | Reg2 | Reg3 | Reg4 | Pipe | Action |
| (Initial) | AX | BX | CX | | | | |
| MOV BX,AX | AX | | CX | BX | | X | Reg3←Reg0 |
| ADD AX,CX | | | CX | BX | AX | Y | Reg4←Reg0+Reg2 |

The representations of the MOV and ADD instructions in the final column of Table 1 are completely independent.

A WAW dependency occurs when two consecutive instructions perform write operations to the same logical register. This type of dependency is illustrated by the pair of instructions shown below:

| X-PIPELINE | Y-PIPELINE |
|---|---|
| (1) ADD AX, BX | (2) MOV AX, [mem] |
| AX ← AX + BX | AX ← [mem] |

Without register renaming, the MOV instruction in the Y-pipeline would have to be stalled to guarantee that the ADD instruction in the X-pipeline would first write its results to the AX register. The processor 200, however, can avoid the Y-pipeline stall, as shown below in Table 2. The contents of the AX and BX registers are placed in physical registers. As each instruction executes, the results are placed in new physical registers to avoid the possibility of overwriting a logical register value and to allow the two instructions to complete in parallel (or out of order) rather than in sequence. All subsequent reads of the logical register AX will refer to Reg3, the result of the MOV instruction.

TABLE 2

Register Renaming with WAW Dependency

| | Physical Register Contents | | | | | |
|---|---|---|---|---|---|---|
| Instruction | Reg0 | Reg1 | Reg2 | Reg3 | Pipe | Action |
| (Initial) | AX | BX | | | | |
| ADD AX,BX | | BX | AX | | X | Reg2←Reg0+Reg1 |
| MOV AX,[mem] | | BX | | AX | Y | Reg3←[mem] |

2.1.5 Data Forwarding

The processor 200 uses two types of data forwarding in conjunction with register renaming to eliminate RAW dependencies, namely, operand forwarding and result forwarding. Operand forwarding takes place when the first in a pair of instructions performs a move from register or memory, and the data that is read by the first instruction is required by the second instruction. The processor performs the read operation and makes the data read available to both instructions simultaneously. Result forwarding takes place when the first in a pair of instructions performs an operation (such as an ADD) and the result is required by the second instruction to perform a move to a register or memory. The processor 200 performs the required operation and stores the results of the operation to the destination of both instructions simultaneously.

2.1.5.1 Operand Forwarding

A RAW dependency occurs when the first in a pair of instructions performs a write, and the second instruction reads the same register. This type of dependency is illustrated by the pair of instructions shown below in the X- and Y-pipelines:

| X-PIPELINE | Y-PIPELINE |
|---|---|
| (1) MOV AX, [mem] | (2) ADD BX, AX |
| AX ← [mem] | BX ← AX + BX |

The processor 200, however, can avoid the Y-pipeline stall, as shown below in Table 3. Operand forwarding allows simultaneous execution of both instructions by first reading memory and then making the results available to both pipelines in parallel. Operand forwarding can only occur if the first instruction does not modify its source data. In other words, the instruction is a move type instruction (for example, MOV, POP, LEA). Operand forwarding occurs for both register and memory operands. The size of the first instruction destination and the second instruction source must match.

2.1.5.2 Result Forwarding

A RAW dependency can occur when the first in a pair of instructions performs a write, and the second instruction reads the same register. This dependency is illustrated by the pair of instructions in the X- and Y-pipelines, as shown below:

| X-PIPELINE | Y-PIPELINE |
|---|---|
| (1) ADD AX, BX | (2) MOV [mem], AX |
| AX ← AX + BX | [mem] ← AX |

The processor 200, however, can use result forwarding to avoid the Y-pipeline stall, as shown below in Table 4. Instead of transferring the contents of the AX register to memory, the result of the previous ADD instruction (Reg0+Reg1) is written directly to memory, thereby saving a clock cycle. The second instruction must be a move instruction and the destination of the second instruction may be either a register or memory.

TABLE 4

Result Forwarding Example

| | Physical Register Contents | | | | |
|---|---|---|---|---|---|
| Instruction | Reg0 | Reg1 | Reg2 | Pipe | Action |
| (Initial) | AX | BX | | | |
| ADD AX,BX | | BX | AX | X | Reg2←Reg0+Reg1 |
| MOV [mem],AX | | BX | AX | Y | [mem]←Reg0+Reg1 |

2.1.6 Data Bypassing

In addition to register renaming and data forwarding, the processor 200 provides a third data dependency-resolution technique called data bypassing. Data bypassing reduces the performance penalty of those memory data RAW dependencies that cannot be eliminated by data forwarding. Data bypassing is provided when the first in a pair of instructions writes to memory and the second instruction reads the same

TABLE 3

Example of Operand Forwarding

| | Physical Register Contents | | | | | |
|---|---|---|---|---|---|---|
| Instruction | Reg0 | Reg1 | Reg2 | Reg3 | Pipe | Action |
| (Initial) | AX | BX | | | | |
| MOV AX,[mem] | | BX | AX | | X | Reg2←Reg2+[mem] |
| MOV AX,[mem] | | | AX | BX | Y | Reg3←[mem]+Reg1 | data from memory. The processor retains the data from the first instruction and passes it to the second instruction, thereby eliminating a memory read cycle. Data bypassing only occurs for cacheable memory locations.

A RAW dependency occurs when the first in a pair of instructions performs a write to memory and the second instruction reads the same memory location. This dependency is illustrated by the pair of instructions in the X- and Y-pipelines, as shown below.

| X-PIPELINE | Y-PIPELINE |
|---|---|
| (1) ADD [mem], AX | (2) SUB BX, [mem] |
| [mem] ← [mem] + AX | BX ← BX − [mem] |

The processor 200 can use data bypassing to stall the Y-pipeline for only one clock cycle by eliminating the Y-pipeline's memory read cycle, as shown below in Table 5. Instead of reading memory in the Y-pipeline, the result of the previous instruction ([mem]+Reg0) is used to subtract from Reg1, thereby saving a memory access cycle.

TABLE 5

Example of Data Bypassing

| Instruction | Physical Register Contents | | | Pipe | Action |
| | Reg0 | Reg1 | Reg2 | | |
|---|---|---|---|---|---|
| (Initial) | AX | BX | | | |
| ADD [mem],AX | AX | BX | | X | [mem]←[mem]+Reg0 |
| SUB BX,[mem] | AX | | BX | Y | Reg2←Reg1−{[mem]+Reg0} |

2.1.7 Branch Control

Programmers have found through simulation and experimentation that branch instructions occur on average every four to six instructions in x86-compatible programs. The processor 200 minimizes performance degradation and latency of branch instructions through the use of branch prediction and speculative execution. The processor 200 uses a 512-entry, 4-way set associative Branch Target Buffer (BTB) 220 to store branch target addresses and a 1024-entry branch history table. During the fetch stage, the instruction stream is checked for the presence of branch instructions. If an unconditional branch instruction is encountered, the processor 200 accesses the BTB 220 to check for the branch instruction's target address. If the branch instruction's target address is found in the BTB 220, the processor 200 begins fetching at the target address specified by the BTB 220.

In case of conditional branches, the BTB 220 also provides history information to indicate whether the branch is more likely to be taken or not taken. If the conditional branch instruction is found in the BTB 220, the processor 200 begins fetching instructions at the predicted target address. If the conditional branch misses in the BTB 220, the processor 200 predicts that the branch will not be taken, and instruction fetching continues with the next sequential instruction. The decision to fetch the taken or not taken target address is preferably, although not necessarily, based on a four-state branch prediction algorithm.

Once fetched, a conditional branch instruction is first decoded and then dispatched to the X-pipeline only. The conditional branch instruction proceeds through the X-pipeline and is then resolved in either the Execution 306 stage or the Write-Back 307 stage. The conditional branch is resolved in the Execution 306 stage if the instruction responsible for setting the condition codes is completed prior to the execution of the branch. If the instruction that sets the condition codes is executed in parallel with the branch, the conditional branch instruction is resolved in the Write-Back 307 stage.

Correctly predicted branch instructions execute in a single core clock cycle. If resolution of a branch indicates that a misprediction has occurred, the processor 200 flushes the pipeline and starts fetching from the correct target address. The processor 200 preferably prefetches both the predicted and the non-predicted path for each conditional branch, thereby eliminating the cache access cycle on a misprediction. If the branch is resolved in the Execution 306 stage, the resulting misprediction latency is four clock cycles. If the branch is resolved in the Write-Back 307 stage, the latency is five clock cycles.

Since the target address of return (RET) instructions is dynamic rather than static, the processor 200 caches target addresses for RET instructions in an eight-entry return stack rather than in the BTB 220. The return address is pushed on the return stack during a CALL instruction and popped during the corresponding RET instruction.

2.1.8 Speculative Execution

The processor 200 is capable of speculative execution following a floating point instruction or predicted branch. Speculative execution allows the X- and Y-pipelines to continuously execute instructions following a branch without stalling the pipelines waiting for branch resolution. As will be described below, the same mechanism is used to execute floating point instructions in parallel with integer instructions. The processor 200 is capable of up to four levels of speculation (i.e., combinations of four conditional branches and floating point operations). After generating the fetch address using branch prediction, the processor 200 checkpoints the machine state (registers, flags, and processor environment), increments the speculation level counter, and begins operating on the predicted instruction stream.

Once the branch instruction is resolved, the processor 200 decreases the speculation level. For a correctly predicted branch, the status of the checkpointed resources is cleared. For a branch misprediction, the processor 200 generates the correct fetch address and uses the checkpointed values to restore the machine state in a single clock. In order to maintain compatibility, writes that result from speculatively executed instructions are not permitted to update the cache or external memory until the appropriate branch is resolved. Speculative execution continues until one of the following conditions occurs: 1) a branch or floating point operation is decoded and the speculation level is already at four; 2) an exception or a fault occurs; 3) the write buffers are full; or 4) an attempt is made to modify a non-checkpointed resource (i.e., segment registers, system flags).

2.1.9 System Register Set

Registers are broadly grouped into two sets, namely: 1) the application register set comprising registers frequently used by application programs, and 2) the system register set comprising registers typically reserved for use by operating system programs. The application register set preferably includes general purpose registers, segment registers, a flag register, and an instruction pointer register. The system register set preferably includes control registers, system address registers, debug registers, configuration registers, and test registers. In order not to obscure the invention, only relevant portions of the system register set will be further described. Those skilled in the art may easily obtain additional descriptions of the application register set by referring to publications such as "The Cyrix 6x86 Microprocessor Data Book," Order No. 94175-00, August 1995, herein incorporated by reference.

Figure 4A:
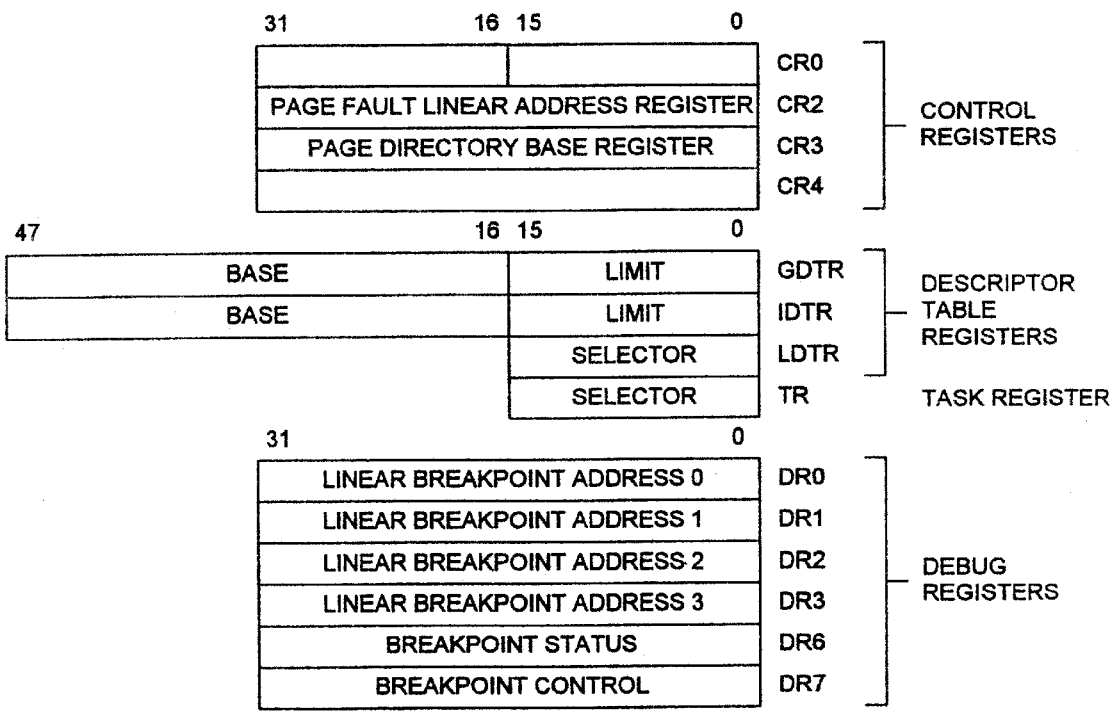
FIGS. 4A and 4B depict a preferred system register set, comprising registers not generally visible to application programmers and typically employed by operating systems and memory management programs.
Figure 4B:
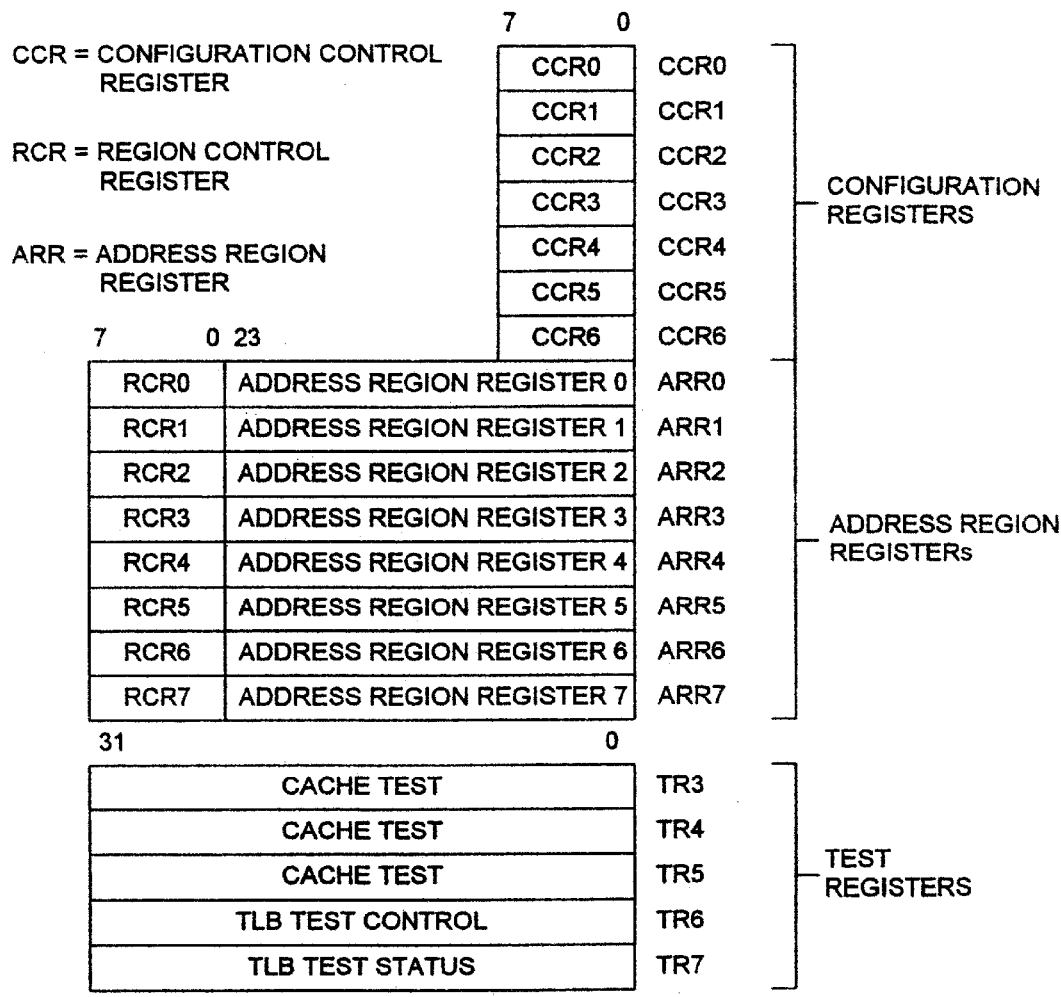

FIGS. 4A and 4B depict a preferred system register set 400, comprising registers not generally visible to application programmers and typically employed by operating systems and memory management programs. The control registers, CR0–CR4, control certain aspects of the processor 200 such as paging, coprocessor functions, and segment protection. The debug registers, DR0–DR7, provide debugging facilities to enable the use of data access break-points and code execution breakpoints. The test registers, TR3–TR7, provide a mechanism to test the contents of both the cache unit 204 and the Translation Look-Aside Buffers, TLB 230 and TLB 235. The configuration control registers, CCR0–CCR7, are used to configure the processor 200's on-chip cache operations, power management features, and System Management Mode, as well as provide information on device type and revision.

The address region registers, ARR0–ARR7, are used to specify the location and size for the eight address regions. Attributes for each address region are specified in the region control registers, RCR0–RCR7. ARR7 and RCR7 are used to define system main memory and differ from ARR0–ARR6 and RCR0–RCR6. With non-cacheable regions defined on-chip, the processor 200 eliminates data dependencies and resource conflicts in its execution pipelines. If KEN# is active for accesses to regions defined as non-cacheable by the RCRs, the region is not cached.

A register index, is used to select one of three bytes in each ARRx. The starting address of the ARRx address region, selected by the START ADDRESS field, must be on a block size boundary. For example, a 128 Kbyte block is allowed to have a starting address of 0 Kbytes, 128 Kbytes, 256 Kbytes, and so on.

The region control registers, RCR0–RCR7, specify the attributes associated with the ARRx address regions. Cacheability, to weak locking, write gathering, and cache-write-through policies can be activated or deactivated using the attribute bits defined in the region control registers.

2.1.9.1 Model Specific Registers

The processor 200 preferably comprises at least four model specific registers (MSRs). The MSRs can be read using the RDMSR instruction. During a register read, the contents of the particular MSR, specified by the ECX register, is loaded into the EDX:EAX registers. The MSR can be written using the WRMSR instruction. During a MSR write the contents of EDX:EAX are loaded into the MSR specified in the register.

2.1.9.2 Debug Registers

At least six debug registers, DR0–DR3, DR6 and DR7, support debugging on the processor 200. Memory addresses loaded in the debug registers, referred to as "breakpoints," generate a debug exception when a memory access of the specified type occurs to the specified address. A data breakpoint can be specified for a particular kind of memory access, such as a read or a write. Code breakpoints can also be set allowing debug exceptions to occur whenever a given code access (execution) occurs. The size of the debug target can be set to 1, At 2, or 4 bytes. The debug registers are accessed via MOV instructions, which can be executed only at privilege level 0. The Debug Address Registers (DR0–DR3) each contain the linear address for one of four possible breakpoints. Each breakpoint is further specified by bits in the Debug Control Register (DR7). For each breakpoint address in DR0–DR3, there are corresponding fields L, R/W, and LEN in DR7 that specify the type of memory access associated with the breakpoint.

The R/W field can be used to specify instruction execution as well as data access break-points. Instruction execution breakpoints are always taken before execution of the instruction that matches the breakpoint.

The Debug Status Register (DR6) reflects conditions that were in effect at the time the debug exception occurred. The contents of the DR6 register are not automatically cleared by the processor 200 after a debug exception occurs and, therefore, should be cleared by software at the appropriate time. Code execution breakpoints may also be generated by placing the breakpoint instruction (INT 3) at the location where control is to be regained. Additionally, the single-step feature may be enabled by setting the TF flat in the EFLAGS register. This causes the to processor to perform a debug exception after the execution of every instruction.

2.1.9.3 Test Registers

The test registers can be used to test the unified L1 cache 245, the L1 TLB 230, and the L2 TLB 235. Test registers TR3, TR4, and TR5 are used to test the unified L1 cache 245 and TR6 and TR7 are used to test the L1 TLB 230 and the L2 TLB 235. Use of these test registers is described in more detail below.

2.1.10 Floating Point Unit

The floating point unit (FPU) 225 processes floating point and multimedia extension instructions and is preferably x87 instruction set compatible, adhering to the IEEE-754 standard. Floating point instructions may execute in parallel with integer instructions. Integer instructions may complete out-of-order with respect to the FPU instructions. The processor 200 maintains x86 compatibility by signaling exceptions and issuing write cycles in program order. Floating point instructions are preferably dispatched to the X-pipeline in the IU 215. The address calculation stage of the X-memory pipeline checks for memory management exceptions and accesses operands used by the FPU 225. If no exceptions are detected, the state of the processor 200 is check-pointed and, during AC2, floating point instructions are dispatched to a FPU instruction queue. The processor 200 can then complete subsequent integer instructions speculatively and out-of-order relative to the FPU instruction and relative to any potential FPU exceptions which may occur.

As additional FPU instructions enter the pipeline, the processor 200 can preferably dispatch four or more FPU instructions to the FPU instruction queue. The processor 200 continues executing speculatively and out-of-order, relative to the FPU queue, until one of the conditions that causes speculative execution to halt is encountered. As the FPU 225 completes instructions, the speculation level decreases and the check-pointed resources are available for reuse in subsequent operations. The FPU 225 preferably has a set of six or more write buffers to prevent stalls due to speculative writes.

2.2 Cache Unit

Figure 5:
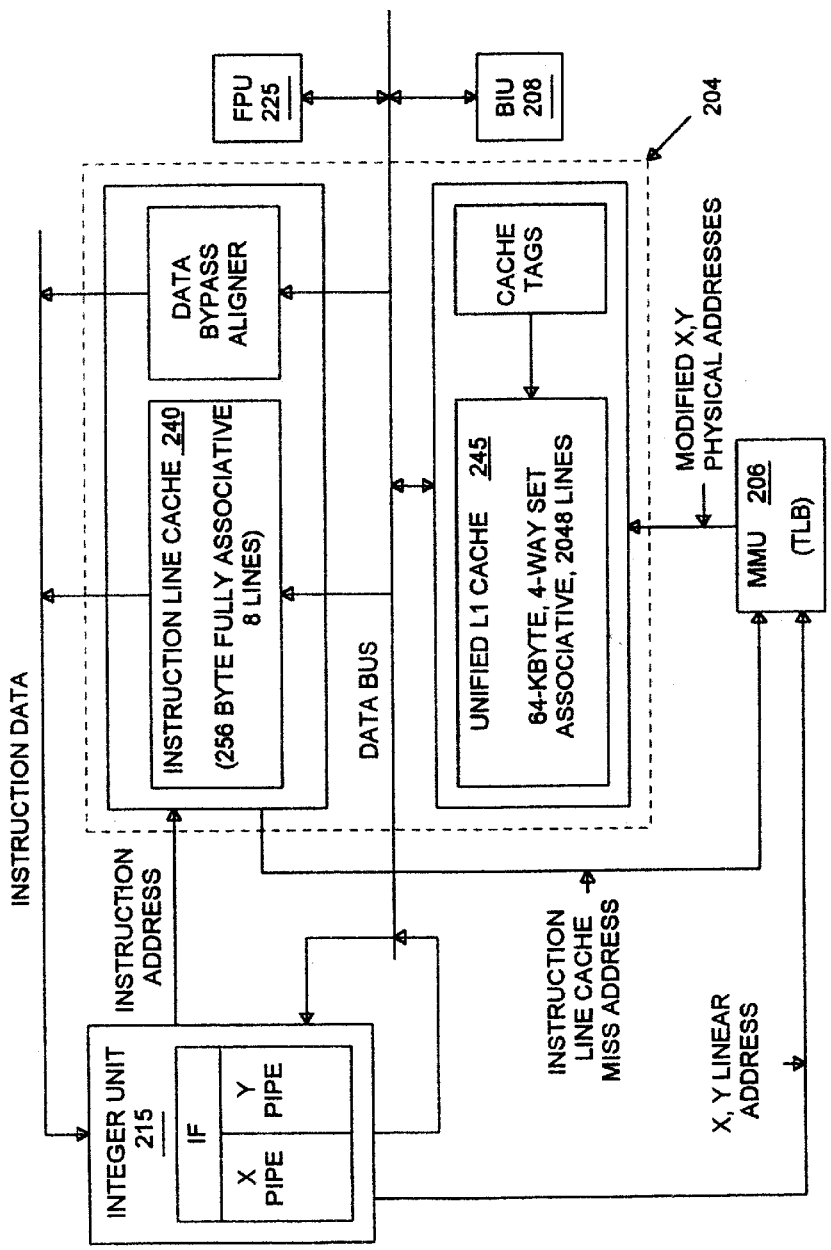
FIG. 5 depicts an exemplary cache unit in accordance with the principles of the present invention.

FIG. 5 depicts an exemplary cache unit 204 in accordance with the principles of the present invention. Those skilled in the art will readily understand that other organizations, sizes and associativities for the cache unit 204 are possible, for which the principles of the present invention may be practiced without departing from the scope of the invention. The cache unit 204 comprises a unified L1 cache 245 and an instruction line cache 240. The unified L1 cache 245 is the primary data cache and secondary instruction cache. The unified L1 cache 245 is preferably, although not exclusively, 64 Kbytes in size and four-way set-associative with a 32 byte line size (2048 lines total).

The instruction line cache 240 is the primary instruction cache, provides a high speed instruction stream to the IU 215, and is preferably, though not exclusively, 256 bytes in size and fully associative. The instruction line cache 240 is filled from the unified L1 cache 245 through the data bus. Fetches from the IU 215 that hit in the instruction line cache 240 do not access the unified L1 cache 245. If an instruction line cache miss occurs, the instruction line data from the unified L1 cache 245 is transferred simultaneously to the instruction line cache 240 and the IU 215. The instruction line cache 240 uses a pseudo-LRU replacement algorithm. To ensure proper operation in the case of self-modifying code, any writes to the unified L1 cache 245 are checked against the contents of the instruction line cache 240. If hit occurs in the instruction line cache 240, the appropriate line is invalidated.

Figure 6:
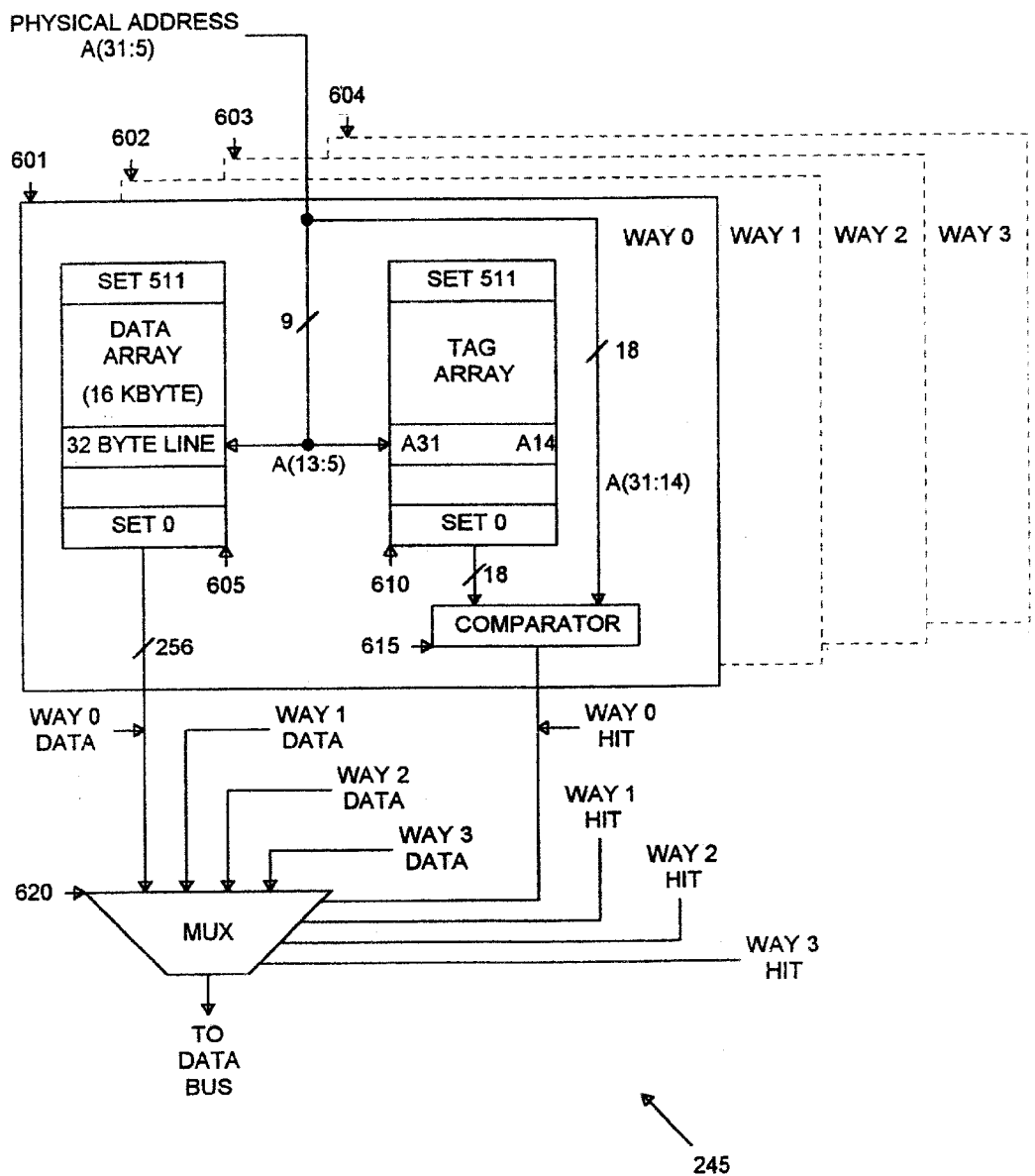
FIG. 6 depicts the exemplary L1 cache in FIG. 2 in greater detail.

FIG. 6 depicts the exemplary L1 cache 245 in FIG. 2 in greater detail. It is recalled that the exemplary L1 cache 245 preferably contains 64 Kbytes of data subdivided into 2048 cache lines of 32 bytes each. The L1 cache 245 is also organized as 512 sets, Sets 0–511, that are divided into four ways, Ways 0–3. Blocks 601–604 in L1 cache 245 comprise Ways 0–3, respectively. Ways 1–3, shown in dotted outline, are functionally equivalent to Way 0. This being the case, only Way 0 need be discussed to explain cache hits and cache misses and the retrieval of data from L1 cache 245.

Each set consists of eight entries: an address tag and a 32-byte cache line from each of the four ways. For example, if address bits A(13:5) are 000000000, Set 0 is being addressed and, in all four ways, a corresponding 32-byte line in data array 605 and a corresponding address tag in tag array 610 are accessed.

Twenty seven physical address bits, A(31:5), are needed to fetch data from the L1 cache 245. Since data are written to, and read from, the L1 cache 245 in entire 32-byte cache lines, the five least significant address bits, A(4:0), are not used. Address bits A(4:0) may be used to address individual bytes within a cache line.

Data must be fetched from the L1 cache 245 (and the external L2 cache 404) using physical addresses. Therefore, address translation is necessary. As explained above, address calculation proceeds in two steps, AC1 and AC2 The lowest twelve (12) address bits, A(11:0), are the page offset and are the same in both the linear and physical addresses. These bits do not require translation. The upper twenty bits, A(31:12), of the linear (or logical) address identify the required 4096 byte page and require translation. Since address bits A(11:0) do not require translation, they are available during AC1 for accessing data in L1 cache 245. Address bits A(31:12) are translated during AC2 and translated bits A12 and A13 become available last.

The linear (or logical) addresses are translated into physical addresses in a TLB (such as the TLB 230 or TLB 235 of FIG. 2). In one embodiment of the present invention, two TLBs are implemented: a 16 entry direct mapped L1 TLB 230 and a 384 entry 6-way associative L2 TLB 235 (again, both of FIG. 2). Each TLB compares some of linear address bits A(31:12) of the current linear address to linear address bits previously stored in the TLB. If a match is found, the corresponding physical address is output from the TLB to the L1 cache 245 and/or the L2 cache 404.

Address bits A(13:5) select a 32-byte line in data array 605 and an address tag in tag array 610 simultaneously in each of the four ways (eight entries total). When a cache line is written into data array 605, the tag address A(31:14), which is a physical address, is simultaneously stored in one of the 512 locations in tag array 610, as determined by the address bits A(13:5). Thus, when address bits A(13:5) are applied to tag array 610, the stored value of tag address A(31:14) is sent to comparator 615 for comparison with address bits A(31:14) of the current physical address. At the same time, the 32 bytes in the data array 605 corresponding to A(13:5) are applied to one of the channels of multiplexer 620.

If the address bits A(31:14) are the same, a cache hit has occurred and one (and only one) of the enable signals, WAY 0 HIT, WAY 1 HIT, WAY 2 HIT, or WAY 3 HIT, will go high for the corresponding way. This will, in turn, select the correct channel of multiplexer 620 (which forms a part of sector selection circuitry) and output a corresponding one of the 32-byte lines of data, referred to generically as WAY 0 DATA, WAY 1 DATA, WAY 2 DATA, or WAY 3 DATA.

Several of the data arrays associated with processor 200 are N-way set associative data arrays. For example, unified L1 cache 245 is a 4-way data array, and L2 TLB 235 is a 6-way data array. External to processor 200, L2 cache 404 may also be 6-way associative. If one of the lines of an N-way associative data array is bad, the data array may still be used, provided the bad line is never accessed. For example, if Address 4 (ADDR4) of Way 0 in L1 cache 245 is corrupted, L1 cache may still be used if ADDR4 of Way 0 is invalidated and never accessed. At this point, ADDR4 is only 3-way associative, but the overall performance of L1 cache 245 should not be noticeably affected. The remaining addresses of L1 cache 245 remain 4-way set associative.

The present invention discloses a circuit and method for testing and validating one or more N-way set associative data arrays in a microprocessor using a single built-in self-test (BIST) controller. In some embodiments of the present invention, N=1, so that the data array is actually a direct mapped data array (i.e., a 1-way set associative data array), such as a direct mapped L1 cache.

In a preferred embodiment of the present invention, the BIST controller is used to validate a portion of L1 cache 245 into which an assembly language BIST program is loaded. Then, the BIST program in the validated portion of L1 cache 245 is executed by the microprocessor in order to validate the remainder of L1 cache 245. Once testing of L1 cache 245 is complete, the BIST program in L1 cache 245 may be used to validate any other structure embedded in, or external to, processor 200. For example, the assembly language BIST program may be used to validate the branch target buffer (BTB) or the floating point unit. Advantageously, this "bootstrap" method of testing uses a very small amount of hardware to validate the data arrays. The assembly language BIST program executed by the microprocessor is "dense" compared to microcode instructions, thereby allowing the microprocessor to perform very thorough and sophisticated tests with a very small amount of assembly language code.

Figure 7:
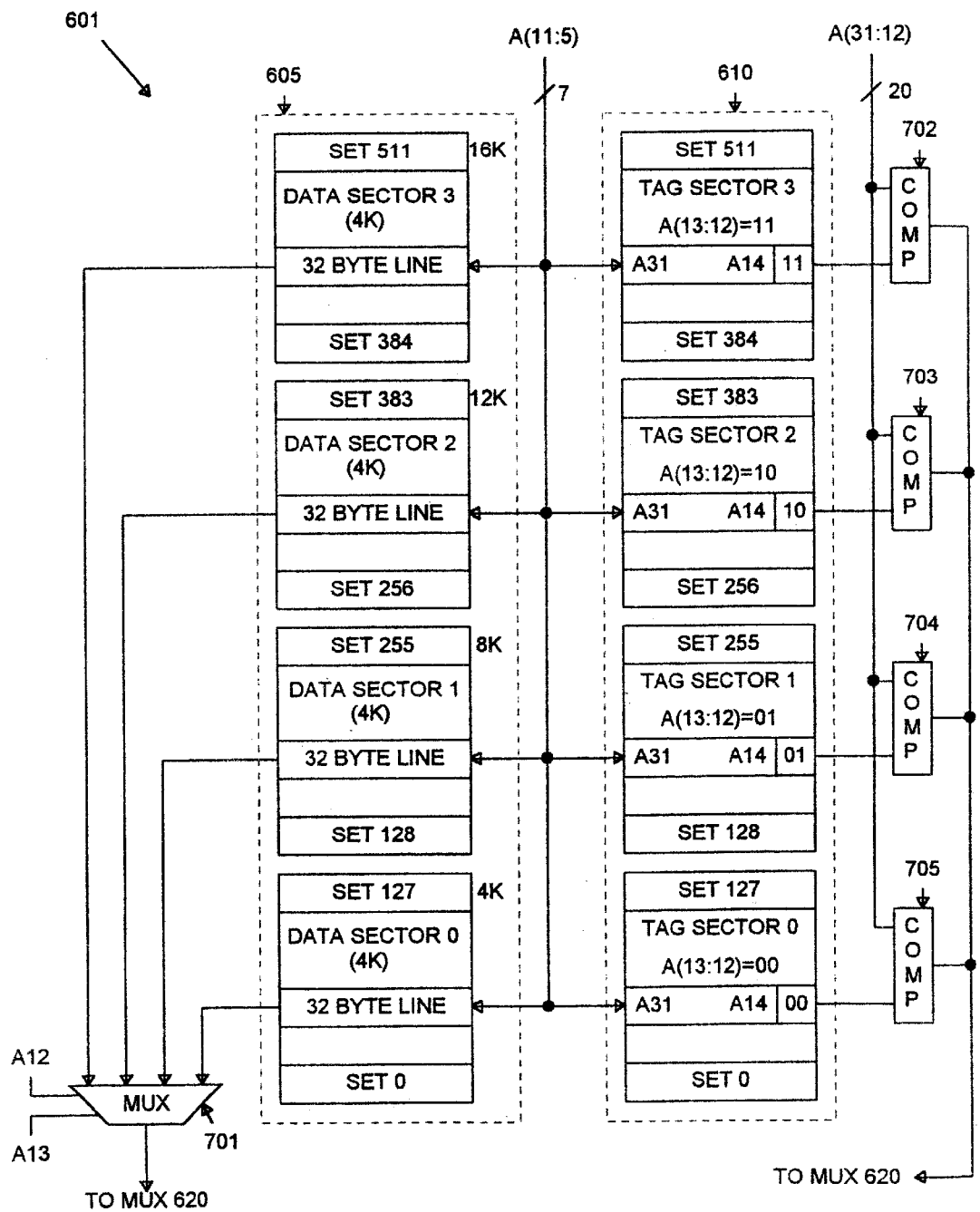
FIG. 7 depicts an exemplary BIST controller associated with the exemplary L1 cache for testing and validating the N-way associative data arrays in the processor depicted in FIG. 2.

FIG. 7 depicts an exemplary BIST controller 700 associated with the exemplary L1 cache 245 for testing and validating the N-way associative data arrays in the processor 200 depicted in FIG. 2. For the purpose of illustrating the operation of BIST processor 700 and BIST program 710, L1 cache 245 is illustrated in a simplified block diagram form, with extraneous circuitry not shown. As explained above, L1 cache 245 comprises four ways 601–604, arbitrarily labeled Way 0, Way 1, Way 2, and Way 3. Each way comprises data array 605 and tag array 610. Each way also comprises a MESI bit array 690. Each entry in tag array 610 contains a "locked" bit that is used to lock a bad cache line in L1 cache 245 and prevent processor 200 from storing data in that cache line in the future. Each entry in MESI bit array 690 contains an "invalid" bit that is used to indicate that a cache line in L1 cache 245 is bad, thereby preventing processor from reading and using the data therein again. Therefore, once a bad cache line is invalidated and locked, processor 200 cannot modify data in the cache line or use any value stored in it.

Additional details regarding the use of locked bits, invalid bits, or MESI bits in general may be found in U.S. patent application Ser. No. 08/865,909 entitled "CACHE WITH FINELY GRANULAR LOCKED-DOWN REGIONS," incorporated by reference above. Further details about locked bits, invalid bits, MESI bits, and/or processor 200 may be found in "Cyrix 6x86MX Processor Data Book," Order No. 94329-00, available from Cyrix Corporation, which is hereby incorporated by reference into the present disclosure as if fully set forth herein.

Processor 200 also comprises a BIST processor 700 and an associated ROM 705. Those skilled in the art will realize that BIST processor 700 may be implemented in a variety of ways. However, in a preferred embodiment of the present invention, BIST processor 700 is a comparatively small microcode-driven state machine. BIST processor 700 interfaces with the control lines of L1 cache 245 so that BIST processor 700 may read and write into all portions of the cache lines of L1 cache 245, including the MESI bits, the tag bits, the data bits, the locked bit and the invalid bit.

BIST processor 700 writes the contents of ROM 705 into a selected location in L1 cache 245. In the illustrated embodiment, the contents of ROM 705 are stored in Way 0 from address 0 (ADDR0) to address 127 (ADDR127). This size and location of Way 0, ADDR0–ADDR127 is arbitrarily chosen for the purposes of illustrating and explaining the principles of the present invention. The contents of ROM 705 may in fact be written into any area of any way in L1 cache 245. Furthermore, the contents of ROM 705, which comprise an assembly language BIST program 710, may require less space, or more space, than is provided in the region from ADDR0–ADDR127.

The contents of ROM 705 comprise an assembly language BIST program 710 that is later used to validate the remainders of Way 0, Way 1, Way 2 and Way 3, as will be explained below in greater detail. After the contents of ROM 705 (i.e., BIST program 710) are stored in Way 0, BIST processor 700 reads back the data at ADDR0–ADDR127 in Way 0 and compares the retrieved data to the contents of ROM 705. If the data "passes" the comparison performed by BIST controller 700, then control is passed to BIST program 710 in Way 0 and processor 200 executes BIST program 710 in order to validate the remainder of L1 cache 245 and, perhaps, other N-way set associative data arrays (internal and/or external) associated with processor 200.

Figure 8A:
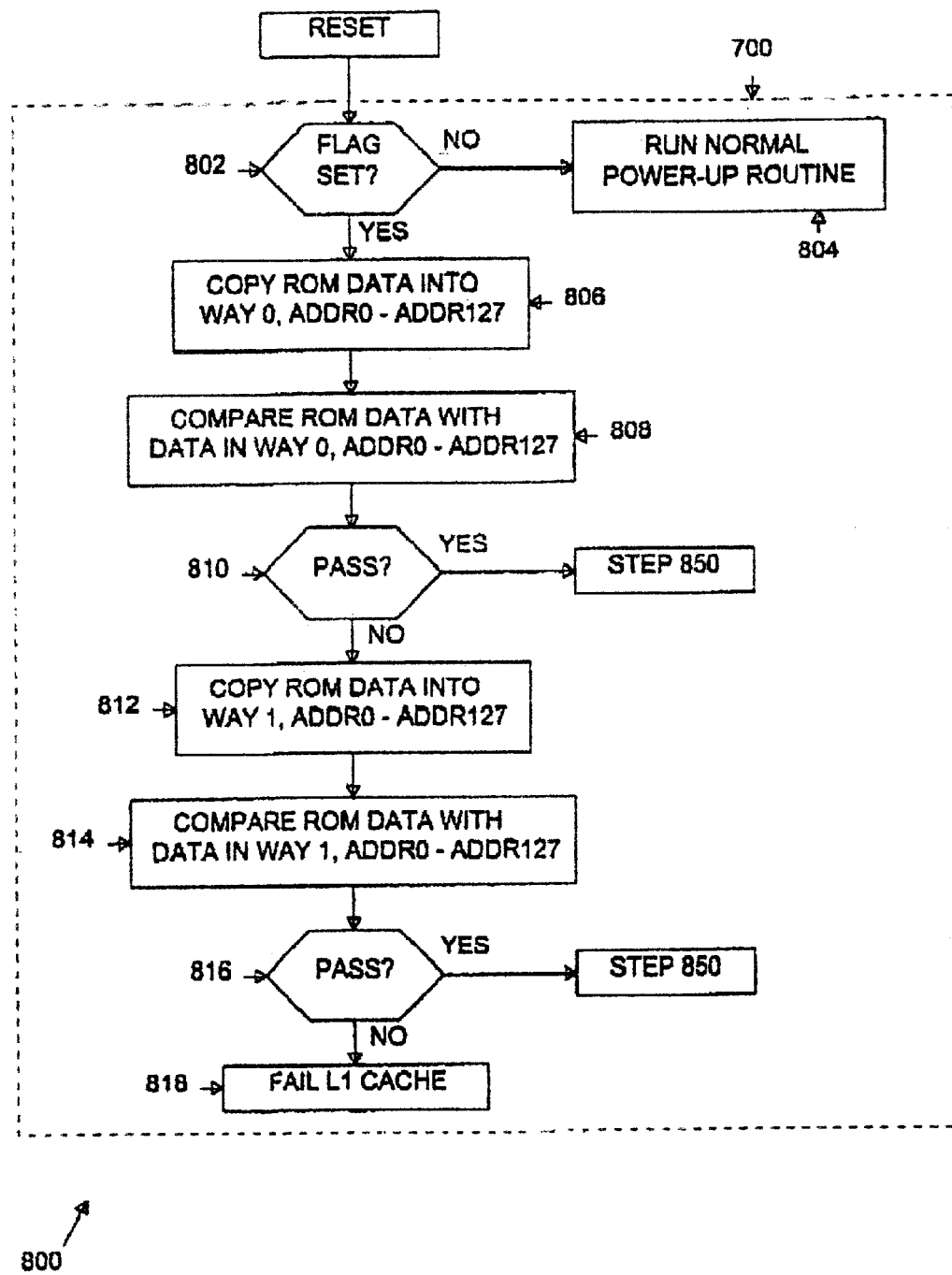
FIGS. 8A and 8B are a flow diagram illustrating the operation of the BIST controller and the processor depicted in FIG. 2.
Figure 8B:
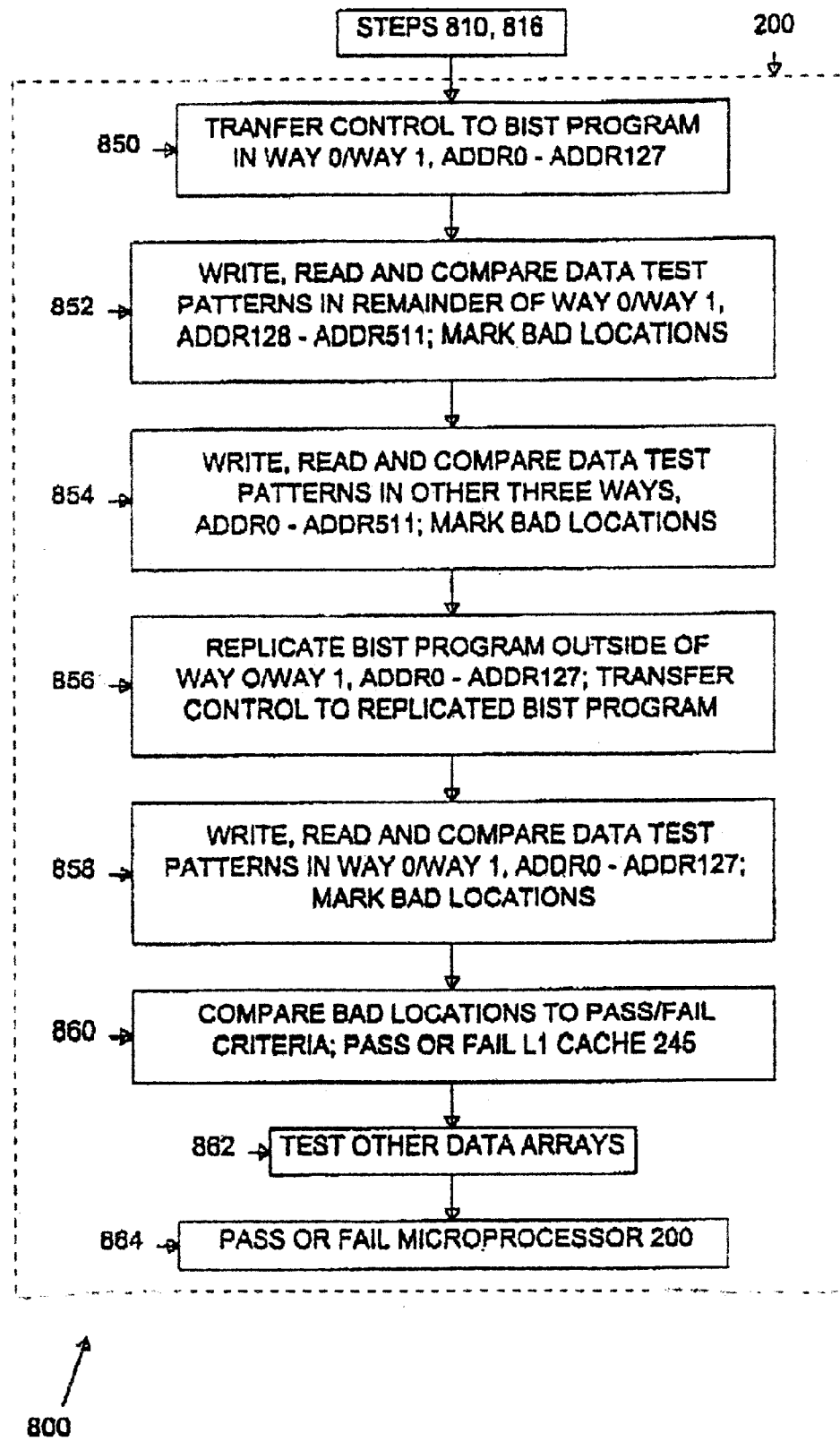

FIGS. 8A and 8B are a flow diagram 800 illustrating the operation of the BIST processor 700 and the processor 200. The process of validating L1 cache 245 is initiated when a power on "RESET" occurs in processor 200. At that point, the normal power-up routine of processor 200 begins. At some point during the power-up routine, BIST processor 700 verifies the status of a hardwired BIST flag in processor 200. The flag is set (or not set) during fabrication of processor 200, thereby allowing BIST controller of the present invention to be enabled or disabled according to the requirements of the customer. If the BIST flag is not set, the built-in self-test routine for L1 cache 245 is bypassed and the normal power-up routine resumes (process steps 802 and 804). However, if the BIST flag is set, BIST processor 700 initiates the validation process for L1 cache 245 by copying the data in ROM 705 into, for example, ADDR0–ADDR127 of Way 0 (process steps 802 and 806).

Next, BIST processor 700 reads the data that was copied into Way 0, ADDR0–ADDR127, and compares it to the original data stored in ROM 705 (process step 808). If all of the data in Way 0, ADDR0–ADDR127, matches the corresponding data in ROM 705, then the cache lines in Way 0, ADDR0–ADDR127 pass and control of the BIST routine is transferred to the BIST program 710 residing in Way 0 (process steps 810 and 850). It should be noted that the simple comparison test performed by BIST processor 700 only establishes that the bits in each cache line at ADDR0–ADDR127 are capable of being set to a single binary value according to the corresponding assembly language instructions in BIST program 710. BIST controller 710 does not toggle the bits in each cache line to a different binary value. That task is performed later by BIST program 710, as explained below.

If any data value read back from Way 0, ADDR0–ADDR127 does not match the corresponding value in ROM 705, the cache line in which the mismatch occurs fails the initial BIST routine. BIST processor 700 then copies the ROM data in ROM 705 into Way 1, ADDR0–ADDR127 in order to repeat the BIST routine using cache lines in Way 1 (process steps 810 and 812). BIST processor 700 then reads back the data stored in Way 1, ADDR0–ADDR127, and compares it to the original data stored in ROM 705 (process step 814). If the retrieved data from Way 1, ADDR0–ADDR127, matches the corresponding data in ROM 705,then the cache lines at Way 1, ADDR0–ADDR127, pass the initial BIST routine and control of the BIST routine is transferred to the BIST program 710 now residing in Way 1, ADDR0–ADDR127 (process steps 816 and 850). However, if any of the retrieved ROM data from Way 1, ADDR0–ADDR127, fails to match the corresponding data in ROM 705,then in one embodiment of the present invention, BIST processor 700 fails L1 cache 245 (process steps 816 and 818). In this scenario, BIST controller fails L1 cache 245 because the multiple errors in corresponding address areas of Way 0 and Way 1 may indicate that a serious defect exists in the cache lines of L1 cache 245. In alternate embodiments of the present invention, BIST processor 700 may continue to copy the contents of ROM 705 (i.e., BIST program 710) into other areas of Way 0, Way 1, Way 2, or Way 3 until the ROM data that is retrieved by processor 700 from the way finally matches the corresponding original data in ROM 705. At some point, however, multiple failures of this comparison test will cause BIST processor 700 to fail L1 cache 245. Typically, the failure of L1 cache 245 will result in a corresponding complete failure of processor 200.

It is noted again that the simple comparison test performed by BIST processor 700 only establishes that the bits in each cache line at ADDR0–ADDR127 of Way 1 are capable of being set to a single binary value according to the corresponding assembly language instructions in BIST program 710. BIST controller 710 does not toggle the bits in each cache line to a different binary A value. Again, that task is performed later by BIST program 710, as explained below.

If either of Way 0, ADDR0–ADDR127, or Way 1, ADDR0–ADDR127, passes the comparison test performed by BIST controller 700, then control of the BIST routine is transferred to BIST program 710 residing in either Way 0, ADDR0–ADDR127, or Way 1, ADDR0–ADDR127 (process step 850). BIST program 710 is an assembly language program that is executable by processor 200. Under the control of BIST program 710, processor 200 repetitively writes a series of data test patterns into the remainder of Way 0 (or the remainder of Way 1, if a failure occurred in Way 0 in process steps 808 and 810) from address 128 through address 511. The data test patterns may include, for example, all Logic 0 levels, all Logic 1 levels, or alternating Logic 0's and Logic 1's. Like BIST controller 700, processor 200, under the control of BIST program 710, is capable of may reading from, and writing into, all portions of the cache lines of L1 cache 245, including the MESI bits, the tag bits, the data bits, the locked bit and the invalid bit.

Processor 200 reads back each data test pattern from ADDR128–ADDR511 in Way 0 (or Way 1) and compares retrieved data test pattern to the original data test pattern. If a cache line fails the comparison, processor 200 sets the invalid bit and locked bit for that cache line in the corresponding way, thereby preventing processor 200 from ever again writing data into that cache line in that way or reading data from it (process step 852).

Next, processor 200, under control of BIST program 710, continues to write data test patterns into the remaining three ways from ADDR0 through ADDR511. Processor 200 then reads back the stored data test patterns and compares the retrieved data test patterns to the original data test patterns to ensure that each cache line in each way is valid. As before, if a retrieved data test pattern does not match the original data test pattern that was written to a certain location, the cache line is marked as "invalid" and the locked bit is set for that cache line (process step 854).

The data test patterns written into each cache line in each of Way 0 through Way 3 are selected so that each bit in each cache line is set to both Logic 0 and Logic 1, thereby ensuring that all bits are able to transition between Logic 0 and Logic 1. At this point, all cache lines will have been tested using data test patterns except for the cache lines in which BIST program 710 resides. As noted above, the comparison test initially performed by BIST processor 700 only verified that the data written into Way 0 (or Way 1), ADDR0–ADDR127, matched the contents of ROM 705. BIST processor 700 did not transition each of the bit positions in Way 0 (or Way 1), ADDR0–ADDR127, from Logic 0 to Logic 1, or vice versa.

Therefore in order to ensure that none of the bits in Way 0 (or Way 1), ADDR0–ADDR127, are stuck at Logic 0 or Logic 1, processor 200, under the control of BIST program 710, replicates BIST program 710 in any validated section of any of Way 0, Way 1, Way 2, or Way 3, that is outside of the location in Way 0 (or Way 1), ADDR0–ADDR127, in which BIST program 710 originally resides. Processor 200 then transfers control of the BIST routine to the replicated BIST program 710 in its new location (process step 856).

Next, processor 200, under the control of the replicated BIST program 710, writes, reads and compares data test patterns in Way 0 (or Way 1), ADDR0–ADDR127. If any of the cache lines from ADDR0 ADDR127 of Way 0 (or Way 1) fails the comparison test, processor 200 sets the invalid bits and locked bits in the failed cache line (process step 858).

After BIST program 710 has tested all of the cache lines in Way 0, Way 1, Way 2 and Way 3, the failed cache lines are compared to selected criteria to determine whether or not L1 cache 245 is serviceable (process step 860). For example, the selected criteria may indicate that if the same cache line address fails in more than one of the four ways of L1 cache 245, then the entire L1 cache 245 is failed. Similarly, the selected pass/fail criteria may establish that if the total number of failed cache lines, regardless of their location, exceeds a maximum threshold value, then the L1 cache 245 fails.

If L1 cache 245 passes the BIST routine performed by BIST processor 700 and BIST program 710, then processor 200, under the control of BIST program 710 may test other structures (including data arrays) embedded in, or external to, processor 200 by writing, reading and comparing data test patterns in the other structures (process step 862 ). These other structures may include, but are not limited to, L2 cache 404, L2 TLB 235, the floating point unit, the branch target buffer, and the like. Finally, BIST program 710 can pass or fail the entire microprocessor 200 based on which of the other structures in microprocessor 200 pass or fail the BIST routine (process step 864).

Those skilled in the art will appreciate that the present invention may be implemented not only in x86 compatible microprocessors, but also in a wide range of comparable processing devices, including digital signal processors (DSPs), micro-controllers and the like. In one particularly advantageous embodiment, the present invention may be implemented in what has come to be known as a "system-on-a-chip" (SOC device). For example, many of the components of computer system 10 in FIG. 1 may be integrated onto a single wafer (i.e., an SOC device). Thus, processor 200, system memory 402, BIOS ROM 702, L2 cache 404, keyboard controller 706, digital video disc (DVD) controllers, CD-ROM controllers, modem controllers, and Ethernet controllers, among others, all may be integrated on a single wafer on which the present invention also resides.

In an SOC embodiment, the BIST processor 700 and the BIST program 710 can access and validate a large number of testable structures, including N-way set associative data arrays, PLA circuits, ROM circuits, RAM circuits, direct mapped (N=1) caches, and the like. This allows for more efficient design of the SOC device, since less built-in self-test circuitry is needed to test greater numbers of internal structures.

Although the present invention has been described in detail, those skilled in the art should understand that they can make various changes, substitutions and alterations herein without departing from the spirit and scope of the invention in its broadest form.

What is claimed is:

1. A built-in self-test (BIST) circuit for testing the validity of storage locations in an N-way set associative data array of any processing device, comprising:

a memory capable of storing a test program executable by said processing device, wherein said test program and is capable of testing the validity of said storage locations in said data array; and a controller capable of copying said test program from said memory into first selected storage locations in a first way in said data array, wherein said controller retrieves at least a portion of said copied test program from said first selected storage locations and compares said retrieved portion to a corresponding portion of said test program in said memory to determine if said retrieved portion and said corresponding portion are identical.

2. The BIST circuit set forth in claim 1 wherein if said retrieved portion and said corresponding portion are identical then said processing device executes said copied test program stored in said first selected storage locations to thereby test the validity of second selected storage locations in at least one of said N ways.

3. The BIST circuit set forth in claim 2 wherein said second selected storage locations and said first selected storage locations are disposed in different ways.

4. The BIST circuit set forth in claim 2 wherein said second selected storage locations and said first selected storage locations are disposed in the same way.

5. The BIST circuit set forth in claim 1 wherein said controller, in response to a determination that said retrieved portion and said corresponding portion are not identical, copies said test program from said memory into third selected storage locations in a second way in said data array.

6. The BIST circuit set forth in claim 5 wherein said controller retrieves at least a portion of said copied test program from said third selected storage locations and compares said retrieved portion to a corresponding portion of said test program in said memory to determine if said retrieved portion and said corresponding portion are identical.

7. The BIST circuit set forth in claim 5 wherein said processing device executes said copied test program stored in said third selected storage locations subsequent to said copying to thereby test the validity of second selected storage locations in at least one of said N ways.

8. The BIST circuit set forth in claim 1 wherein said memory is a read-only memory (ROM).

9. The BIST circuit set forth in claim 1 wherein said data array is a cache memory in said processing device.

10. A computer system having any processing device for executing instructions and processing data stored in a system memory, said processing device comprising:

an N-way set associative cache for storing portions of said data or ones of said instructions; and a built-in self-test (BIST) circuit for testing the validity of storage locations in said cache, said BIST circuit comprising:

a memory capable of storing a test program executable by said processing device wherein said test program is capable of testing the validity of said storage locations in said cache; and a controller capable of copying said test program from said memory into first selected storage locations in a first way in said cache, wherein said controller retrieves at least a portion of said copied test program from said first selected storage locations and compares said retrieved portion to a corresponding portion of said test program in said memory to determine if said retrieved portion and said corresponding portion are identical.

11. The computer system set forth in claim 10 wherein if said retrieved portion and said corresponding portion are identical said processor executes said copied test program stored in said first selected storage locations to thereby test the validity of second selected storage locations in at least one of said N ways.

12. The computer system set forth in claim 11 wherein said second selected storage locations and said first selected storage locations are disposed, in different ways.

13. The computer system set forth in claim 11 wherein said second selected storage locations and said first selected storage locations are disposed in the same way.

14. The computer system set forth in claim 10 wherein said controller, in response to a determination that said retrieved portion and said corresponding portion are not identical, copies said test program from said memory into third selected storage locations in a second way in said data array.

15. The computer system set forth in claim 14 wherein said controller retrieves at least a portion of said copied test program from said third selected storage locations and compares said retrieved portion to a corresponding portion of said test program in said memory to determine if said retrieved portion and said corresponding portion are identical.

16. The computer system set forth in claim 14 wherein said processing device executes said copied test program stored in said third selected storage locations subsequent to said copying to thereby test the validity of second selected storage locations in at least one of said N ways.

17. The computer system set forth in claim 10 wherein said memory is a read-only memory (ROM).

18. The computer system set forth in claim 10 wherein said data array is a cache memory in said processing device.

19. A method for testing the validity of storage locations in an N-way set associative data array of a processing device, comprising the steps of:

storing in a memory in the processing device a test program executable by the processing device, wherein the test program is capable of testing the validity of the storage locations in the data array;

copying the test program from the memory into first selected storage locations in a first way in the data array;

retrieving at least a portion of said copied test program from said first selected storage locations; and comparing said retrieved portion to a corresponding portion of said test program in the memory to determine if said retrieved portion and said corresponding portion are identical.

20. The method set forth in claim 19 further comprising the step of executing the copied test program stored in the first selected storage locations if said retrieved portion and said corresponding portion are identical to thereby test the validity of second selected storage locations in at least one of the N ways.

21. The method set forth in claim 20 wherein the second selected storage locations and the first selected storage locations are disposed in difference ways.

22. The method set forth in claim 20 wherein the second selected storage locations and the first selected storage locations are disposed in the same way.

* * * * *